United States Patent [19]

Stavropoulos

[11] Patent Number: 4,580,467

[45] Date of Patent: Apr. 8, 1986

[54] METHOD OF MAKING EXTRUSION DIE FOR EXTRUDING GEARS

[76] Inventor: Gus Stavropoulos, 23865 Edinburgh, Southfield, Mich. 48034

[21] Appl. No.: 728,196

[22] Filed: Apr. 29, 1985

[51] Int. Cl.[4] .................... B23P 15/24; B21C 25/08
[52] U.S. Cl. .............................. 76/107 R; 219/69 M; 83/19; 83/176; 408/19
[58] Field of Search ............ 76/107 R, 107 A, 101 R, 76/107 S; 219/69 V, 69 M; 29/1.1, DIG. 42; 83/17, 19, 176; 408/19; 51/324

[56] References Cited

U.S. PATENT DOCUMENTS 3,768,344 10/1973 Feldcamp .................... 76/107 R
4,287,749 9/1981 Bachrach et al. ............... 76/107 R

FOREIGN PATENT DOCUMENTS 633698 11/1978 U.S.S.R. ............... 219/69 M

*Primary Examiner*—Roscoe V. Parker
*Attorney, Agent, or Firm*—Basile Weintraub Hanlon

[57] ABSTRACT

An extrusion die for extruding helical gears or the like is formed with an extrusion passage having a predetermined draft by initially forming a blank with a central bore and frusto conical outer side surface coaxial with the bore. The formed blank is then forcibly pressed into a frusto conical bore in a die case. The frusto conical bore in the die case is tapered at an angle less than that of the outer surface of the die blank, thus when seated in the bore, radial compressive forces are applied to the blank which progressively increase in magnitude from the small diameter end of the blank to its large diameter end. While so compressed, helical gear teeth are cut into the wall of the central bore of the blank. Upon removal from the case, the blank metal expands radially to provide the machined central passage with the desired draft.

1 Claim, 5 Drawing Figures

METHOD OF MAKING EXTRUSION DIE FOR EXTRUDING GEARS

BACKGROUND OF THE INVENTION

Until recently, the conventional methods of producing gears involved a hobbing or some other metal cutting operation in which metal from the gear blank was removed by successive and repeated passes of a tool through the blank, removing a small amount of metal on each pass. Recent developments in the extrusion art have demonstrated the possibility of forming gears by extrusion, a process which presents the advantage of forming the gear in a single pass between the die or tool and the gear blank. The nature of the extrusion process is such that the extrusion die must be provided with an axially extending draft or taper which permits the metal being extruded to expand slightly after it has passed through the narrowest portion of the extrusion passage of the die.

To form a die for extruding a metal gear, the die passage is formed as an internal gear. It is a relatively simple machining operation to form such an internal gear if its pitch circle is of uniform diameter over the entire axially extent of the gear. In an extrusion die, however, instead of having the pitch circle at all axial locations lie on a cylindrical surface, the pitch circles at all axial points must lie on a frusto conical surface in order to achieve the necessary draft or taper required by the extrusion process. The machining of an internal gear whose pitch circles lie on such a frusto conical surface is a complex machining operation, particularly where a die for extruding a helical gear is involved.

The present invention is especially directed to a method by which an extrusion die for forming helical gears or other articles of complexly modified generally circular cross sections may be accurately and efficiently formed by means of relatively simple shop procedures.

SUMMARY OF THE INVENTION

In accordance with the present invention, a die blank is preliminarily formed with a smooth bore of approximately the desired final minimum diameter of the extrusion passage. The outside diameter surface of the die blank is machined to a frusto conical shape having a taper inclined in the same direction desired for the draft or taper of the finished extrusion passage of the die.

This die blank is then pressed into a frusto conical bore in a die case. The minimum diameter of the die case bore is equal to the small diameter end of the die blank, while the maximum diameter end of the die blank bore is smaller than the diameter of the large diameter end of the die blank. Thus, when the die blank is press seated in the die case bore, the walls of that bore exert a radial compressive force on the die blank which progressively increases from the small diameter end of the blank to its large diameter end.

While the die blank is maintained in this radially compressed condition, a set of internal helical gear teeth are cut into the wall of the bore, preferably by an electrical discharge machining operation.

The die blank is then removed from the die case, and the consequent release of the radial compression allows the machined extrusion passage to expand in proportion to the compression released at any given point, thus providing the passage with the desired frusto conical taper or draft.

The outside diameter of the blank is then machined to its final configuration.

Other objects and features of the invention will become apparent by reference to the following specification and to the drawings.

IN THE DRAWINGS

Figure 1:
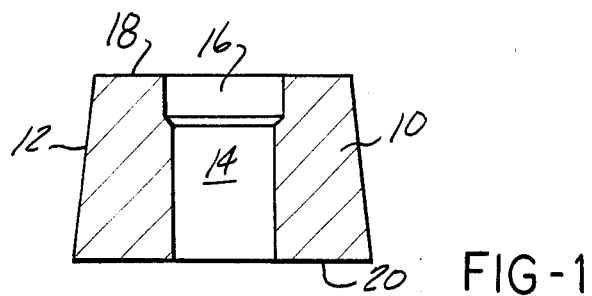
FIG. 1 is a cross sectional view of a die blank.

In the drawings, certain tapers and angular relationships have been grossly exaggerated for purposes of explanation.

Referring first to FIG. 1, there is shown a die blank 10 at the conclusion of a preliminary machining operation. The blank 10 is formed with a frusto conical outer surface 12 and a central bore 14 having an enlarged diameter counterbored section 16 at the upper or small diameter end 18 of die blank 10. In FIG. 1, the taper of the frusto conical outer sides 12 of the die is greatly exaggerated. In one specific example, the small diameter end 18 of the die blank 10 would be 3.005 inches and the large diameter end 20 would be of a diameter of 3.045 inches giving, in a die blank whose height was 2.02 inches a taper of 0° 34'.

Figure 2:
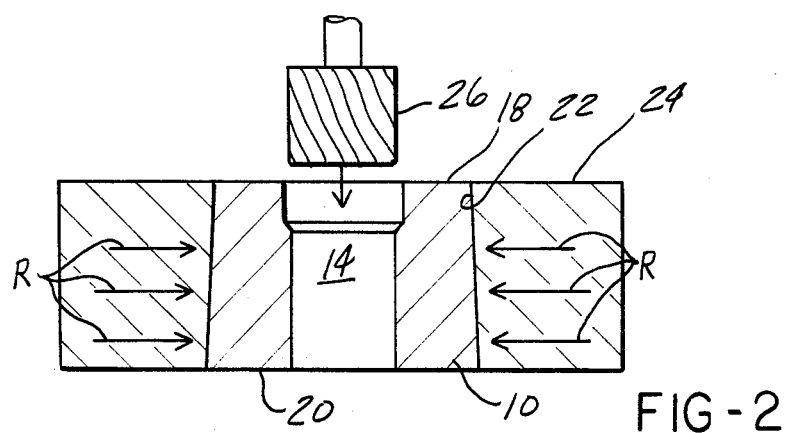
FIG. 2 is a cross sectional view of the die blank of FIG. 1 seated in a die case in accordance with the present invention.

In FIG. 2 the next subsequent step of the operation is shown with die blank 10 seated within a frusto conical bore 22 in a die case 24. The taper of the frusto conical bore 22 of die case 24 is less than that of die blank 10. In terms of diameters, the small diameter end of the tapered die case bore 22 is the same as that of the small diameter end 18 of the die blank. In the specific example given above, the small diameter end of bore 22 would be 3.005 inches in diameter. The diameter of the large diameter end of bore 22 would be 3.030 inches, the thickness of die case 24 being the same as the axial dimension of die blank 10. The actual taper of bore 22 in this example is 0° 21'16" as compared to the 0° 34' angle of the die blank taper.

The die blank is seated in the die case by a pressing operation, and by virtue of the difference in taper between the die blank bore 22 and the outer surface 12 of die blank 10, seating of die blank 10 in bore 22 radially compresses die blank 10. The magnitude of this radial compression progressively increases from zero at the small diameter end of the blank to a maximum radial compression at the large diameter end of the blank. This compression is schematically indicated in FIG. 2 by the arrows R whose length is roughly approximated to the magnitude of the radial compression at the various locations.

While die blank 10 is radially compressed within die case 24, a set of helical gear teeth are cut into the wall of bore 14 by an electrical discharge machining tool schematically indicated at 26 which, upon passage through bore 14 forms a set of helical gear teeth in the wall of the bore.

Figure 3:
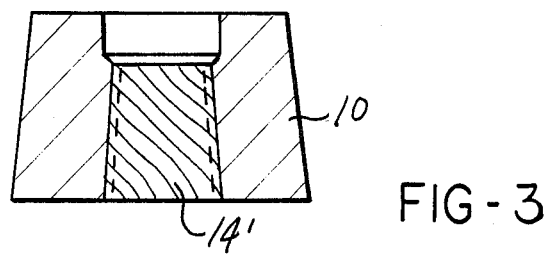
FIG. 3 is a cross sectional view of the die blank subsequent to its removal from the die case of FIG. 2.

The machined die blank 10 is then removed from die case 24 and, upon the consequent release of the radial compression, relaxes to a configuration schematically shown in FIG. 3. The inclination of the taper of the outer side of the die blank and of the inclination of the newly formed helical gear section are grossly exaggerated in FIG. 3 for purposes of illustration. However, upon removal of the radial compression by the removal of the die blank from the die cage, the machined passage will expand in the manner illustrated to provide the desired taper or draft to the helical gear section of the extrusion passage.

Figure 4:
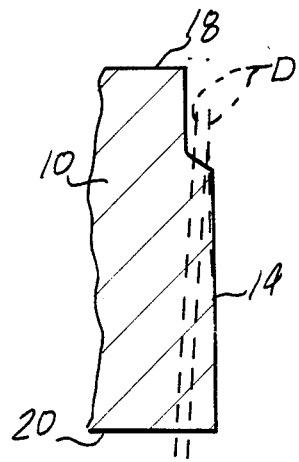
FIGS. 4 and 4a are schematic diagrams which will be referred to in explaining certain steps of the method.
Figure 4A:
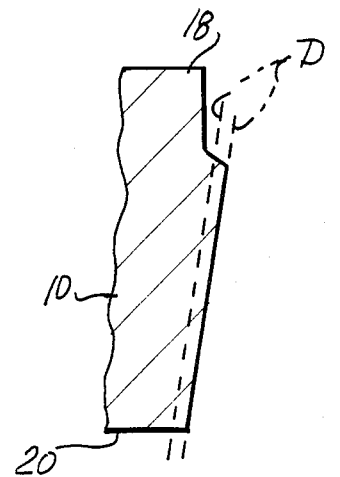

FIGS. 4 and 4a are illustrative of what has occurred in the process described above. Referring first to FIG. 4, seating of the die blank in the die cage applied radial compressive forces to the die blank which tended to compress or distort the wall of bore 14 from its original truly cylindrical shape into a downwardly and inwardly tapering frusto conical surface. While in this condition, a tool having a depth of cut extending between the parallel broken lines D of FIG. 4 was passed axially through passage 14 to form the major and minor diameters of the helical gear teeth on the respective dotted lines D. In this operation, all metal to the right of the right hand broken line D of FIG. 4 was removed.

Upon release of the radial compression, the machined surface between the two broken lines D relaxed to the configuration of FIG. 4a.

After the die blank 10 is removed from die case 24, its outer surface is machined to the desired file configuration.

While one embodiment of the invention has been described in detail, it will be apparent to those skilled in the art that the disclosed embodiment may be modified as, for example, to produce extrusion dies for articles other than helical gears. Therefore, the foregoing description is to be considered exemplary rather than limiting and the true scope of the invention is that defined in the following claims.

I claim:

1. A method of making an extrusion die for extruding helical gears or the like comprising the steps of:

forming a die blank with a central bore of a diameter equal to or less than the desired minimum diameter of the extrusion passage of the finished die and an outer side surface of frusto conical shape coaxial with said bore and lying at a first angle to the axis thereof to form said blank with a small diameter end at that end of the blank which is to be the inlet end of the finished die and a large diameter end at the opposite end of the blank;

pressing said die blank into a frusto conical bore in a die case, said frusto conical bore having a surface lying at an angle to its axis less than said first angle and said frusto conical bore having a small diameter end of a diameter equal to that of the small diameter end of said blank, said blank being pressed into said bore to locate the small diameter end of said blank at the small diameter end of said frusto conical bore to thereby apply radially compressive forces to said blank which progressively increase in magnitude from the small diameter end of the blank to its large diameter end;

machining a set of internal helical gear teeth in the central bore of said blank while said radially compressive forces are applied thereto; and removing the die blank from said case and machining the outer surface of said blank to the desired final die configuration.

* * * * *